UNITED STATES PATENT OFFICE.

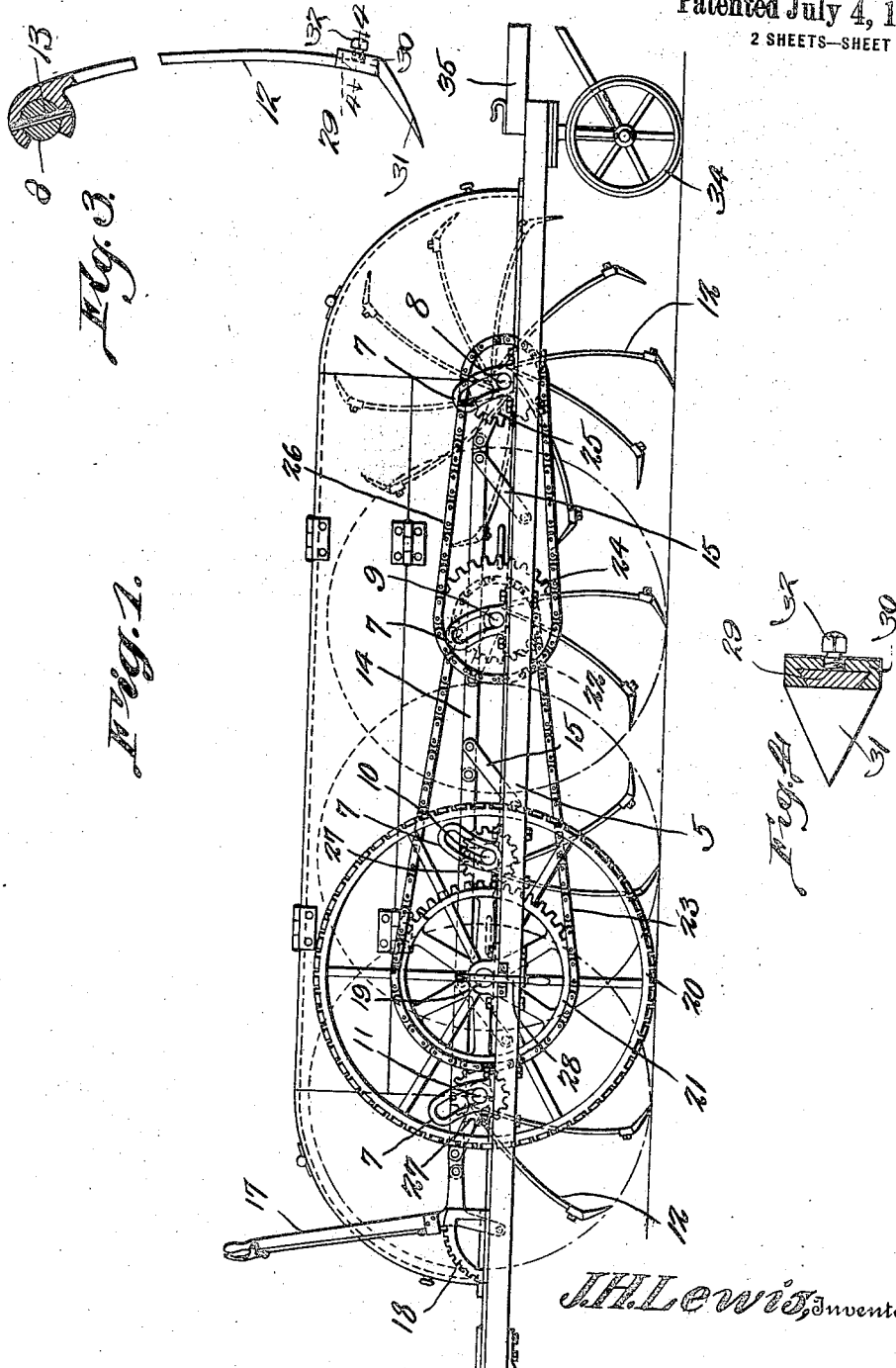

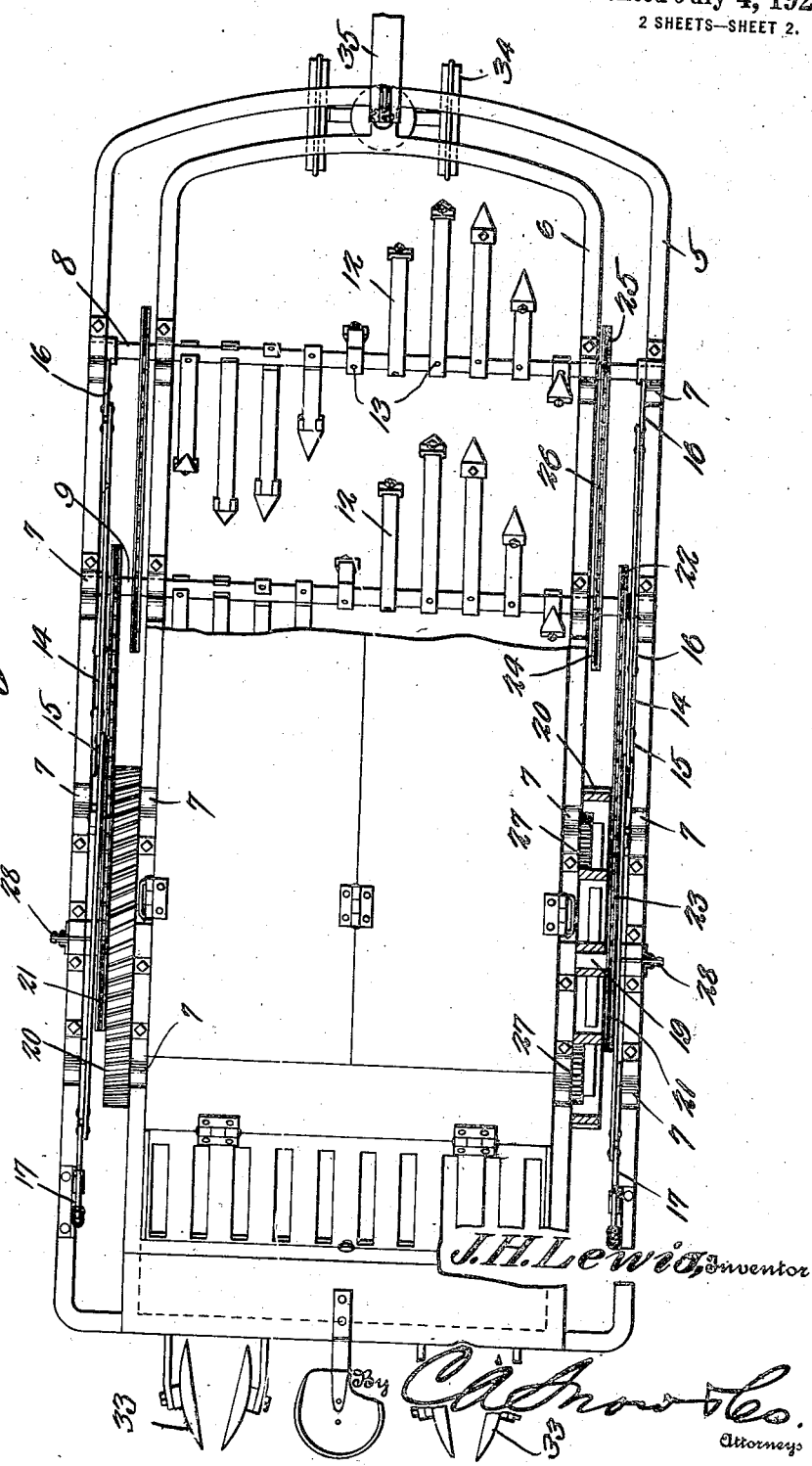

JOHN H. LEWIS, OF RHINELANDER, WISCONSIN.

FARMING MACHINE.

1,421,968.  Specification of Letters Patent.  Patented July 4, 1922.

Application filed September 21, 1920. Serial No. 411,712.

*To all whom it may concern:*

Be it known that I, JOHN H. LEWIS, a citizen of the United States, residing at Rhinelander, in the county of Oneida and State of Wisconsin, have invented a new and useful Farming Machine, of which the following is a specification.

The present invention relates to agricultural machines, and more particularly to a machine especially designed for use as a combined cultivator, harrow, weed exterminator or the like.

The primary object of the invention is to provide a machine of this character which will accomplish a cultivating and harrowing result simultaneously, thereby preparing the soil for planting, with a single operation of the machine.

A further object of the invention is the provision of rotary means for contacting with the ground surface over which the machine is moving, for loosening and cultivating the soil, the means being constructed so that the same may be thrown into and out of operation at the will of the operator.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 illustrates a side elevational view of a machine constructed in accordance with the present invention.

Figure 2 illustrates a plan view of the same, a portion of the hood being broken away to illustrate the soil engaging fingers.

Figure 3 illustrates a detail view of the one of the soil engaging fingers, and

Figure 4 illustrates a sectional view taken on line 4—4 of Figure 3.

Referring to the drawings in detail, the machine includes an outer frame 5 and an inner frame 6, the rails forming the inner frame being disposed in spaced relation with the rails of the outer frame to provide a clearance between the frames to accommodate suitable operating gearing to be hereinafter more fully described.

Bearing members 7 are arranged on the frames, in spaced relation with each other, in which bearings are supported the shafts 8, 9, 10 and 11 respectively, each bearing including an elongated opening to permit the shafts supported therein to move through the openings for increasing or decreasing the distance between the shafts, and ground surface over which the same operate to accomplish the adjusting of the earth engaging arms with relation to the ground surface over which the same operate.

Secured to each of the shafts 8, 9, 10 and 11, are a plurality of earth engaging arms 12, each of which has one end thereof embracing a portion of the shaft, there being provided a pin 13 associated with each arm for securing the arm to its shaft against movement thereon, the shafts at the rear of the machine operating in directions opposite to the directions of rotation of the shafts at the forward end of the machine. As shown, these arms 12 are disposed in spaced relation with each other throughout the lengths thereof, and are arranged spirally around their shafts, so that a predetermined number of arms will be contacting with the ground surface at all times.

Having connection with the outer frame 5, are the operating bars 14 which are disposed at opposite sides of the frame and have pivotal connection therewith through the medium of the levers 15, the operating bars having connection with the respective shafts 8, 9, 10 and 11, as by means of the arms 16 whereby movement of the shafts to cause the same to move within their bearings.

Controlling levers indicated at 17 have connection with the bars 14, at one end thereof, the levers 17 having pivotal connection with the frame to cause the bars 14 to move upwardly, as before described to accomplish the adjustment of the shafts, there being provided a keeper 18 associated with each lever 17, for securing the levers in various positions of adjustment.

The frames are mounted on the supporting shaft 19, on which operate the bull wheels 20, which carries a relatively large sprocket wheel 21, designed to move therewith, which sprocket wheel communicates motion to the relatively small sprocket wheel 22, through the chain 23, which sprocket wheel 22 causes the rotation of the sprocket wheel 24, which in turn imparts rotary movement to the sprocket wheel 25 through the chain 26, the sprocket wheel 21 being constructed to transmit rotary motion to the sprocket wheel 27.

The sprocket wheels have connection with the shafts so that rotary motion of the sprocket wheels will be imparted to the shafts to cause the operation of the earth engaging arms 12. A suitable mechanism is provided adjacent the sprocket wheel 21, and controlled by the lever 28, whereby the sprocket wheel 21, may be moved into and out of operation to control the operation of the shafts.

A suitable hood is designed to house the earth engaging arms 12 to prevent the arms 12 from throwing earth or the like into the sprockets to cause the same to clog. This hood also protects the operator from flying stones or the like to eliminate any possibility of the operator becoming injured while in the act of cultivating a field.

It might be further stated however that the lower end of each arm 12 is dove-tailed, as at 29 to be positioned within a correspondingly dove-tailed opening of the head 30 forming a part of the removable point 31, a set screw 32 being provided in connection with each point to secure the same to its arm.

At the rear of the machine are positioned the disks 33 which are inclined towards each other and designed to throw the soil inwardly towards the plants under cultivation when the device is being used as a cultivator.

The forward portion of the machine is supported by the relatively small wheels 34 which in turn have connection with the draft bar 35 by means of which power may be applied to the machine to move the same over a field.

In the operation of the device, the machine is positioned at one end of a field, and the lever 17 is moved to allow the earth engaging arms to contact with the ground surface. The clutch lever 28 is now operated to throw the sprocket wheels into gear, with the result that the shafts 8, 9, 10 and 11 revolve, the points 31 digging into the ground surface to cultivate the same. When the machine has reached one end of the field the lever 17 is operated to throw the sprocket wheels out of operation, and simultaneously move the earth engaging arms out of contact with the earth surface to allow the machine to be readily and easily turned.

If the machine is to be used as a cultivator and hiller, the center arms of each shaft are removed, thus allowing the drawing clamps to pass between the arms without being injured, and converting the machine into a straddle row cultivator.

Having thus described the invention, what is claimed as new is:—

1. An agricultural machine including an outer frame and an inner frame, bull wheels for supporting the frames, a plurality of bearing members supported on the frames, each of said bearing members including an elongated curved opening, a plurality of shafts supported on the frame, and having their extremities operating in the opening, operating means having connection with the shafts for moving the shafts into and out of operation, and a plurality of earth engaging arms supported by the shafts.

2. An agricultural machine including frames, disposed in spaced relation with each other, curved bearing members supported by one of the frames, each of said bearing members including an elongated opening, a plurality of shafts supported by the frames, said shafts having their ends disposed in the elongated openings, operating bars supported by the frames, relatively short arms connecting the operating bars and frames, pivoted arms connecting the operating bars and shafts, means for moving the operating bars to raise and lower the shafts, means for transmitting motion to the shafts, and a plurality of earth engaging arms carried by each shaft.

In testimony that I claim the foregoing as my own, I have hereto affixed my signature in the presence of two witnesses.

JOHN H. LEWIS.

Witnesses:
C. L. NICHOLS,
P. F. SEIBEL.